US009225206B2

(12) United States Patent
Farquharson et al.

(10) Patent No.: US 9,225,206 B2
(45) Date of Patent: Dec. 29, 2015

(54) WINDMILL GENERATOR

(71) Applicant: NuSpecies Global Machines Corporation, Stormville, NY (US)

(72) Inventors: Aston Gustavous Farquharson, Stormville, NY (US); Victor Roland Vargas Mousaa, Beacon, NY (US)

(73) Assignee: NUSPECIES GLOBAL MACHINES CORPORATION, Stormville, NY (US)

( * ) Notice: Subject to any disclaimer, the term of this patent is extended or adjusted under 35 U.S.C. 154(b) by 0 days.

(21) Appl. No.: 14/284,577

(22) Filed: May 22, 2014

(65) Prior Publication Data

US 2014/0346779 A1    Nov. 27, 2014

Related U.S. Application Data

(63) Continuation-in-part of application No. 13/900,851, filed on May 23, 2013.

(51) Int. Cl.
*H02K 1/17* (2006.01)
*F03D 9/00* (2006.01)
*H02K 21/26* (2006.01)
*F03D 3/06* (2006.01)

(52) U.S. Cl.
CPC *H02K 1/17* (2013.01); *F03D 3/062* (2013.01); *F03D 3/065* (2013.01); *F03D 9/002* (2013.01); *H02K 21/26* (2013.01);
(Continued)

(58) Field of Classification Search
CPC ....... H02K 35/04; H02K 21/26; H02K 21/28; H02K 1/17; F03D 9/002; F03D 3/065; F03D 3/062
USPC ................ 290/1 A, 44, 55; 60/641.8, 641.11, 60/641.12; 320/101; 318/117; 323/906; 126/569, 604; 356/216
See application file for complete search history.

(56) References Cited

U.S. PATENT DOCUMENTS 4,410,805 A * 10/1983 Berley ........................... 290/1 R
6,249,058 B1 * 6/2001 Rea ................................. 290/55
6,756,719 B1    6/2004 Chiu
(Continued)

FOREIGN PATENT DOCUMENTS

WO    WO 2010112685 A2 * 10/2010
WO    2010/135484 A2    11/2010

OTHER PUBLICATIONS

Lee W. Young, PCT Notification of Transmittal of the International Search Report and the Written Opinion of the International Searching Authority, or the Declaration, Date of Mailing Sep. 30, 2014, 9 pages.

*Primary Examiner* — Tulsidas C Patel
*Assistant Examiner* — Viet Nguyen
(74) *Attorney, Agent, or Firm* — Madeline F. Schiesser; Keohane & D'Alessandro PLLC

(57) ABSTRACT

A windmill generator is provided configured to produce electric current to a receiving device when flux lines of a magnetic field are crossed by a coil. The windmill generator comprises a coil frame armature around which a coil is wrapped. Rare earth magnets are disposed in proximity to the coil. A set of wings may be coupled to the coil frame armature. When motion is induced to the coil from the pushing effect of moving air pushing the set of wings, an electric field and electric current due are produced due to flux lines of the magnetic field of the magnet being crossed by the moving coil. Alternatively, the set of wings may be coupled to the at least one magnet. When motion is induced to a magnet, an electric field/electric current is produced.

19 Claims, 6 Drawing Sheets

(52) U.S. Cl.
 CPC ........... *F05B 2220/706* (2013.01); *Y02E 10/72* (2013.01); *Y02E 10/74* (2013.01)

(56) References Cited

U.S. PATENT DOCUMENTS

| | | |
|---|---|---|
| 2007/0040385 A1 | 2/2007 | Uchiyama |
| 2010/0102570 A1 | 4/2010 | Boyd-Wilson et al. |
| 2010/0213723 A1 | 8/2010 | Kazadi |
| 2010/0301608 A1* | 12/2010 | Rush ................. 290/50 |
| 2011/0084494 A1* | 4/2011 | Andujar ............ 290/55 |
| 2011/0084495 A1* | 4/2011 | Wu et al. ............ 290/55 |
| 2012/0204564 A1* | 8/2012 | Battaglia ............ 60/641.8 |
| 2013/0009404 A1* | 1/2013 | Trachsell ............ 290/55 |
| 2014/0159374 A1* | 6/2014 | Farquharson et al. ....... 290/55 |
| 2014/0159377 A1* | 6/2014 | Farquharson et al. ....... 290/1 A |

* cited by examiner

WINDMILL GENERATOR

CROSS-REFERENCE TO RELATED APPLICATION

This application is a continuation-in-part and claims priority to U.S. patent application Ser. No. 13/900,851, filed May 23, 2013, the entire contents of which is incorporated by reference in its entirety.

FIELD OF THE INVENTION

The present invention relates to a method and apparatus for generating electricity generally from wind energy, but more particularly to a method and apparatus for generating electricity either or both of natural and artificial sources of wind or air energy.

BACKGROUND OF THE INVENTION

Windmills are powered by their sails from the turbulence of atmospheric winds. Sails are found in different designs from primitive common sails to advanced patent sails. Meanwhile, alternative forms of generating electricity are important for many known reasons. Many windmills now continue to prove costly due to, for example, complex manufacturing methods and the weight of the materials. As such, there is a need for a cost-effective method and apparatus that can harness the atmospheric pressure from wind turbulence at a reasonable price to produce an electrical field for the public. Alternatively, and more particularly, there is a need for a cost-effective method and apparatus to generate electricity using natural or artificial wind and/or air energy.

SUMMARY OF THE INVENTION

In some embodiments, like the inside of a Shurite amp meter, a stationary magnet with its magnetic force is positioned within (i.e. substantially in the middle) of a framed loop/solenoid coil(s) which is placed on a pinpoint needle(s) (or a device or rod that has sharp end points at one or both ends like a needle—for example a nail or a screw); wherein a magnet may balance the loop/solenoid coil. A set of wings, vanes, blades, or a wind turbine (a wind turbine vent) are coupled to a frame about which the loop/solenoid coil(s) is wrapped. When motion is induced to the coil(s) from the "pushing" effect of moving wind or air (from a natural and/or artificial source) striking the set of wings, this ultimately causes the production of an electric field and electric current due to flux lines of the magnetic field of the magnet(s) being crossed by the moving coil(s). Alternatively, the set of wings are coupled to a magnet(s), with the loop/solenoid coil or coils separately attached to the apparatus and remaining stationary. When motion is induced to the magnet(s) from the "pushing" effect of moving wind or air striking the set of wings, an electric field and electric current is produced due to flux lines of the magnetic field of the magnet(s) being crossed by the coil(s).

A first aspect of the present invention provides an electricity generator, comprising: at least one magnet disposed in proximity to a coil frame armature, the coil frame armature comprising a frame around which a coil is wrapped, wherein the electricity generator is configured to generate electricity in response to the coil crossing flux lines of a magnetic field of the at least one magnet.

A second aspect of the present invention provides an electricity generator, comprising: a turbine blade assembly; a coil frame armature rotatably supported by two needles and mechanically coupled to the turbine blade assembly; and a magnet disposed below the coil frame armature; wherein in response to flux lines of a magnetic field of the at least one magnet being crossed by the coil, electricity is generated.

A third aspect of the present invention provides an electricity generator comprising: a coil frame armature disposed to rotate within an outer frame; a set of wings attached to the coil frame armature; a first neodymium magnet disposed within the coil frame armature; a second neodymium magnet disposed above the outer frame; a positive wire connected from a first end of the coil frame armature to a first pinpoint needle engaged with the outer frame; and a negative wire connected from a second end of the coil frame armature to a second pinpoint needle engaged with the outer frame.

BRIEF DESCRIPTION OF THE DRAWINGS

These and other features of this invention will be more readily understood from the following detailed description of the various aspects of the invention taken in conjunction with the accompanying drawings in which.

Figure 1:
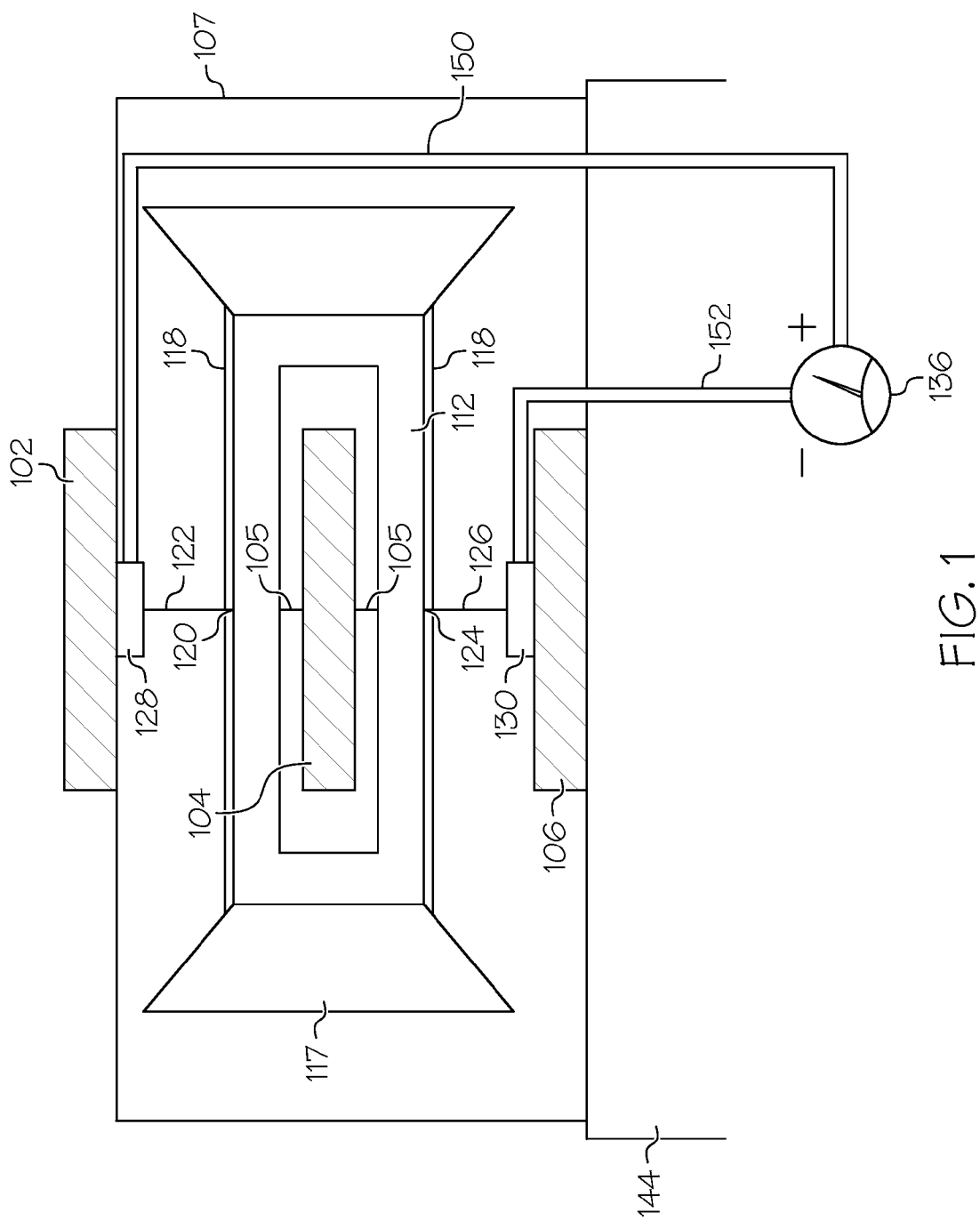
FIG. 1 is a side view of an embodiment of the present invention utilizing three center-mounted magnets.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. When a word ends with "(5)", it will be understood that the item referred to by the term may include the singular item or a plurality of such item, i.e. it means "at least one" of the item. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Reference throughout this specification to "one embodiment," "an embodiment," "embodiments," "exemplary embodiments," "some embodiments", or similar language, means that a particular feature, structure, or characteristic described in connection with the embodiment is included in at least one embodiment of the present invention. Thus, appearances of the phrases "in one embodiment," "in an embodiment," "in embodiments", "in some embodiments", and similar language throughout this specification may, but do not necessarily, all refer to the same embodiment. It will be understood that one skilled in the art may cross embodiments by "mixing and matching" one or more features of one embodiment with one or more features of another embodiment. Any variations of embodiments resulting from such crossing is included within the scope of the invention.

Embodiments of the present invention provide a method and apparatus for generating electricity by coil(s) or at least one magnet in motion. The at least one magnet may be any suitable size or shape. Moving air pushes a set of wings, blades, or vanes (each hereinafter referred to as "a set of wing" or "wings", for simplicity), or a turbine. The moving air may originate from any natural or artificial source, such as, without limitation, natural wind, a fan, or even a person blowing. The set of wings may be coupled to a coil frame armature, causing the coil(s) to cross flux lines of a magnetic field created by the magnet(s) when moving air pushes the set of wings. Vice versa, the set of wings may be coupled to magnet(s), causing flux lines of the magnet(s) to cross the coil(s) when in motion from moving air pushing the set of wings, thereby creating an electrical field or electricity. The set of wings can be comprised of aluminum, plastic, metal, or cardboard in a variety of shapes. The coil frame armature may be comprised of plastic, ceramic, or another suitable material.

Embodiments of the present invention provide a method and apparatus for creating electricity on a tangible scale. In some embodiments, like inside a Shurite amp meter, a magnet with its magnetic force is positioned substantially in the middle of a rectangular loop/solenoid coil ("coil(s) 118") wrapped around an inner frame referred to as coil frame armature, which is disposed on a magnetized (non-magnetized) pinpoint needle(s) (also referred to herein for simplicity as "needle(s)") of the magnet to balance the coil frame armature. Another magnet(s) can be placed above or below or beside the coil in close proximity to create electricity. Pinpoint needs may be comprises of a conductive metal such as copper and/or aluminum, etc.

In some embodiments, only a magnet above or below or beside the coil wrapped around the coil frame armature is used, i.e., no magnet is placed within the coil frame armature. A set of wing(s) are coupled to the coil frame armature, typically, but not limited to at the interfaces of sides of the coil frame armature. When moving air "pushes" into the wings, the coil frame armature holding the coil is caused to rotate at a constant 360 degrees through flux lines of the magnet(s), where ultimately electric currents will be produced. When magnetic flux lines are crossed by the loop/solenoid coil in motion due to a source of energy, an electric current is produced. Likewise, in some embodiments, the set of wings are attached to the magnet(s), rather than the coil frame armature, such that when moving air pushes the set of wings, the magnet(s) rotate while the coil(s) remain stationary. When magnetic flux lines of the magnet cross the loop/solenoid coil while magnet(s) are in motion due to a source of energy, an electric current is produced.

Figure 2:
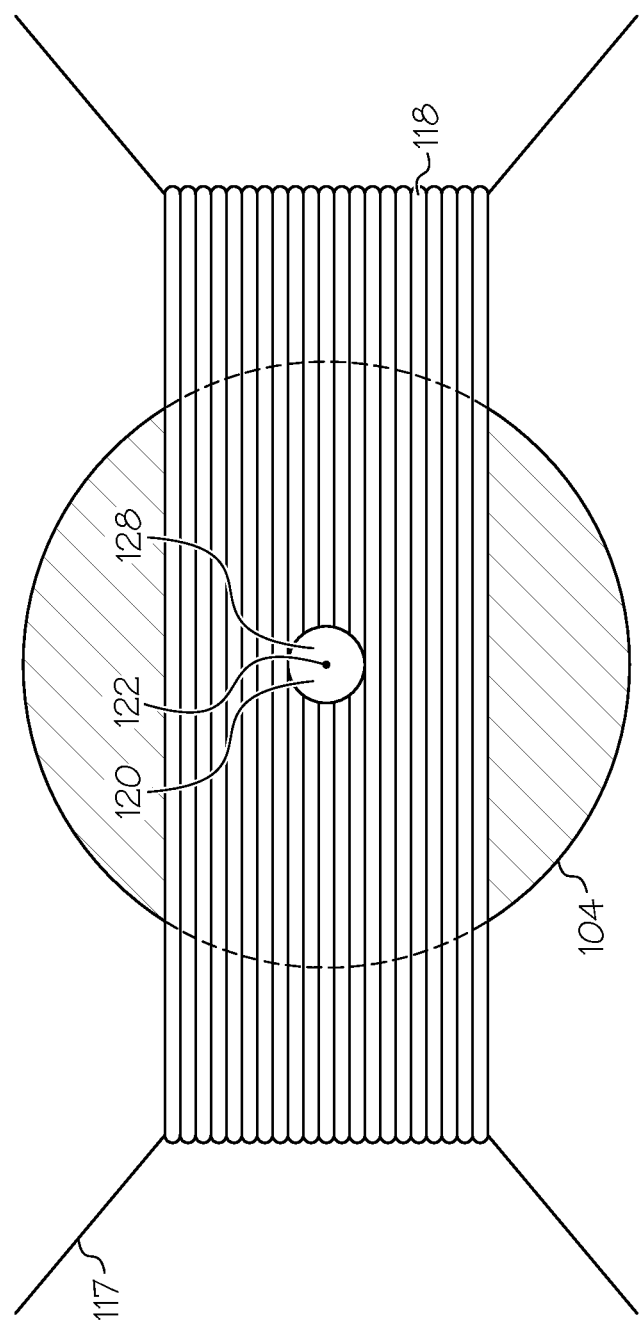
FIG. 2 is a top-down view of an embodiment of the present invention.

Referring now to FIGS. 1 and 2, there is a first magnet 104, a second (middle) magnet 102 above the first magnet 104, and a third magnet 106 below the first magnet 104. The magnets are in proximity to a coil(s) 118 wound around a coil frame armature 112 such that magnetic fields from the magnets 102, 104, and 106 are incident upon the coil(s) 118. In some embodiments, at least one of the first magnet 104, second magnet 102, and third magnet 106 is a rare earth magnet. In embodiments, the rare earth magnets may include neodymium magnets, and/or samarium-cobalt magnets. As an alternative to a single magnet, an array of magnets may be used at each position (where each of first magnet 104, second magnet 102, and third magnet 106 are shown). For example, magnet 102 may be replaced by multiple smaller magnets. Magnet(s) 102 is positioned above the second magnet(s) 104. The magnetic field of the top magnet(s) 102 holds stationary the middle magnet 104($s$) in place with the help of the needles 105, 122, and 126 attached to magnet(s) 104 and suspended or "floating" between surface areas of metal plates 128 and 130. Metal plates 128 and 130 are formed of a conductive metal such as copper, gold, silver, aluminum, and/or tungsten, etc. Coil(s) is in electrical contact with metal plates 126 and 130 by way of needles 122 and 126 respectively, to deliver electricity to the meter 136. The top magnet 102 is situated on a holding device on the outer frame 107 of the apparatus and magnet(s) 102 is stationary. It will be recognized that the magnet(s) 102 can be situated atop any suitable apparatus that holds it in place. The outer frame 107 houses the coil frame armature 112, which is discussed further herein. The second magnet(s) 104 can be of any shape on the horizontal axis. With the help of needles (105, 122, and 126), magnet(s) 102 (above) and magnet(s) 104 (middle) are kept at a predetermined distance from each other. The distance is based on the size of the magnets and or the distance to which the flux lines of the magnetic field extend.

In embodiments, magnet(s) 104 becomes suspended by a magnetized needle when spaced at an appropriate distance from magnet(s) 102. In some embodiments, the magnet(s) 102 and magnet(s) 104 are the same size and have the same Surface Gauss, and in other embodiments, the magnet(s) 102 and magnet(s) 104 can be different sizes with different Surface Gausses from one another. In this embodiment, the coil frame armature 112 holding coil(s) 118 is rotated by motion of the attached wing(s) 117 by natural wind or wind or air from artificial source (source of energy) while magnet(s) 104 and/or 102 are stationary, creating electricity from coil(s) 118 crossing the flux lines of magnets 104 and/or 102.

In alternative embodiments, suspended magnet 104 is rotated by attached wing(s) 117 being motion by natural wind or moving air from artificial source while stationary coil(s) 118 are within the magnet(s) 104 and/or magnet(s) 102 flux lines, creating electricity.

Magnetized needle keeps the magnet(s) 104 (middle) suspended due to the attractional field of magnet(s) 102, so that the coil(s) 118 is kept lighter than its natural weight wherein for example a 20-pound coil or magnet could weigh mere ounces while suspended in this embodiment. This magnetic field also keeps magnet 104 (below) stationary.

Figure 3:
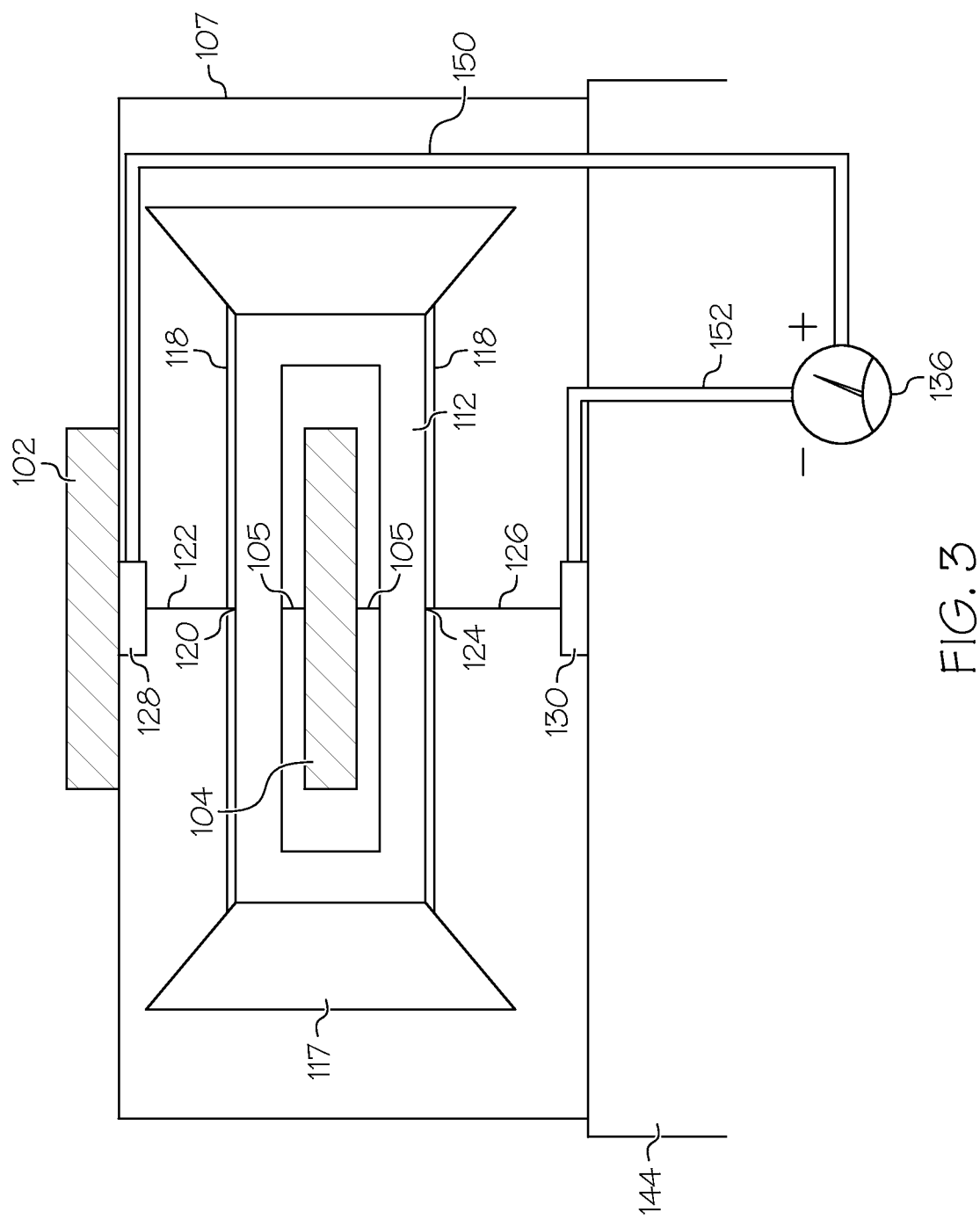
FIG. 3 is a side view of an alternative embodiment of the present invention utilizing two center-mounted magnets.

In a related embodiment (referring now to FIG. 3), magnet(s) 106 is not present. However, magnet(s) 104 and magnet 102 are present and attached to pinpoint needle(s) 105 122, and 126 are held lightly in place by metal plates (or other metal hard surfaces) 128 and 130 respectively wherein wires are attached 128 and 130 with the wires positive 150 and negative 152 to meter 136 for the electric circuit.

Figure 4:
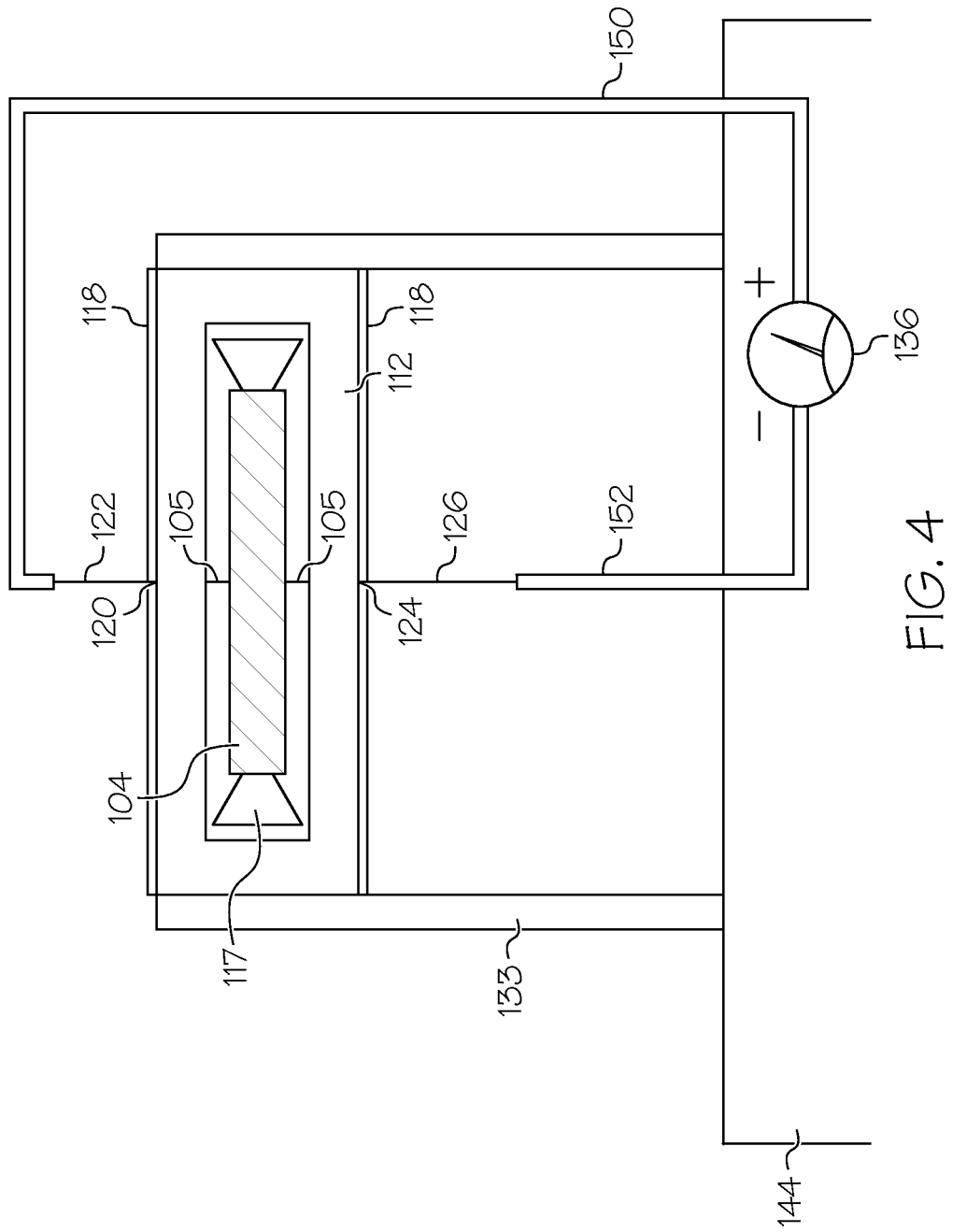
FIG. 4 is a side view of an alternative embodiment of the present invention utilizing one center-mounted magnet.

In yet another related embodiment (referring now to FIG. 4), magnet(s) 102 also is not present. However, magnet(s) 104 is present and attached to pinpoint needle(s) 105, 122, and 126 are held lightly in place by metal plates (or other metal hard surfaces) 128 and 130 respectively wherein wires are attached 128 and 130 with the wires positive 150 and negative 152 to meter 136 for the electric circuit. Therefore, in this embodiment, electricity is generated by rotating the attached magnet(s) 104 with attached wings 117 while the attached coil(s) 118 are stationary. In other embodiments, wing(s) 117 are attached to the coil frame armature 112 (holding the coil(s) 118). Therefore, while the coil(s) 118 are in motion, the magnet(s) 104 are stationary, thereby generating electricity. In this embodiment, an aspect of the present invention provides a method of generating electricity by using a needle(s) 105, 122 and 126 and attached plates 128 and 130, wherein the sharp points of the needle(s) creates "weightlessness" and/or considerably less friction such that the actual weight of the rotating coil(s) 118 or the rotating magnets 104 are respectively considerably less than their natural weight. For example, a 20-pound magnet(s) or a 20-pound coil(s) could be weightless. The weightlessness and/or reduced friction created by this invention causes faster and stronger and easier velocity when either magnet(s) 104 or coil(s) 118 are rotated. Such considerable weightlessness and/or reduced friction may be achieved in embodiments of this invention, merely using a human child to blow on the inventive apparatus to push the wings or wind turbine attached to the needle(s) 105, 122 and 126, generating electricity when either the magnet(s) 104 or coil(s) 118 rotate. In this embodiment and an aspect of the present invention provides a method of generating electricity wherein a much faster rotation per minute is achieved with more electricity being generated twenty four hours per day and seven days per week unlike prevailing existing wind technology. In this embodiment and an aspect of the present invention provides a method of generating electricity wherein minimal natural wind or artificial air (any Source of Energy) will rotate respective magnet(s) 104 or coil(s) 118 generating electricity on a 24 hour basis, thus solving the problem of requiring stronger wind to generate electricity.

In all the foregoing embodiments in these aspects of the invention once any Source of Energy pushes the wing(s) 117, the coil(s) 118 or magnet(s) 104 rotates a 360 degree turn because of the considerable weightlessness achieved and the reduced friction. Weightlessness and reduced friction exist because of the suspending (i.e. "floating") aspects of the invention. The sharp needle points 105, 122 and 126 allow such movement. Once in motion, the magnet(s) or coil(s) will continue to turn on its own in the 360 degree motion for a considerable time period (angular momentum) without any Source of Energy pushing the wing, the wings or wind turbines.

In some embodiments, a first end 120 of coil wire 118 (the coil may also be referred to herein as "loop") engages with needle 122 and a second end 124 of coil wire 118 engages with a needle 126. Needles 122 and 126 engage with indentations of a first metal plate 128 and second metal plate 130, respectively. The coil winding is in electrical contact with plates 126 and 130 by way of needles 122 and 126 respectively, to deliver electricity to the meter 136. The first plate 128 is situated over the top of coil frame armature 112, and second plate 130 is situated under the bottom of coil frame armature 112. In embodiments, the first plate 128 and second plate 130 are each formed of a conductive metal, such as copper. This in turn will balance and rotate the wing(s) 117 attached to the coil frame armature 112 wherein moving air, such as natural wind and or an artificial air source causes the coil frame armature 112 to turn the coil(s) 118 throughout the flux lines of the stationary magnet or magnets 102, 104, 106, creating electricity.

The winding copper coil 118, is attached to the coil frame armature 112, which will be connected to right side up and upside down using pinpoint needles 122 and 126 and/or other metal objects acting as needles. Such needles rotate and also make electrical contact with both the positive wire 150 and negative wire 152 causing the electron flow to create an electric current. It should be noted that there is little resistance from frictional force, except from the rare earth magnets 102, 104 which is stationary above and below the point of the stationary magnetic needle(s) 105 on the base 144. The first and second wires attach to meter 136 to indicate, for example, the amount of electricity being generated.

In some embodiments, a set of wings 117 are coupled to the coil frame armature 112 (e.g. at the interfaces of its sides). Other embodiments may utilize wing shapes other than that shown, such as curved surfaces, etc. In some embodiments, the set of wings may comprise more or fewer than the four wings as shown. In some embodiments, the set of wings could include a shape of turbines (see FIG. 6), used as vents, attached to the needle(s) 105, 122 and 126.

The present invention also comprises a receiving device. In the example embodiment chosen for the purpose of disclosure, the receiving device is a micro/milliamp meter (also referred to herein as "scale") 136. The scale 136 serves as an indication that an electric current is generated through embodiments of the present invention. The scale 136 may also be referred to or regarded herein as a receiving device that ultimately makes use of the electric current generated.

The set of wings 117 are formed such that they are capable of revolving seamlessly via their connection to the coil frame armature 112 (or in some embodiments, connection to the magnets), which is balanced on the magnetic needle 105, 122 and 126. When moving air hits wings 117, the wings are pushed, causing the coil frame armature 112 to spin on the needle 105, 122 and 126. At the same time, magnetic lines of force are formed as the magnets 102 and 104 remain stationary.

An embodiment of the present invention comprises coil(s) 118 which, for example, comprise copper. Coil(s) 118 may comprise other metals, such as gold, silver, tungsten, etc. Copper wire is a good conductor of electricity when in motion rotating around a magnet. According to Faraday's law, electricity is produced whenever magnetic lines of force between stationary magnets 102, 104 cuts across the coil(s) 118, which is part of a complete circuit. This may occur when the coil(s) 118 is in motion (due to wings 117 attached at coil frame armature 112), or when the magnet 104 is in motion (due to wings attached to magnet 104).

The coil(s) 118 in the embodiments are formed by winding a wire (e.g., made of copper) in the shape of a spiral around coil frame armature 112. The coil(s) 118 in fact act like a magnet when the current is turned on. What happens is that the copper coil 118 possesses similar magnetic lines of force around it as an ordinary magnet does. As mentioned above, whenever magnetic lines cut across the coil(s) 118 in a full circuit based on the revolutions per minute, an electric current is generated within the axle or coil spring of the scale 136 or other receiving device.

Figure 5:
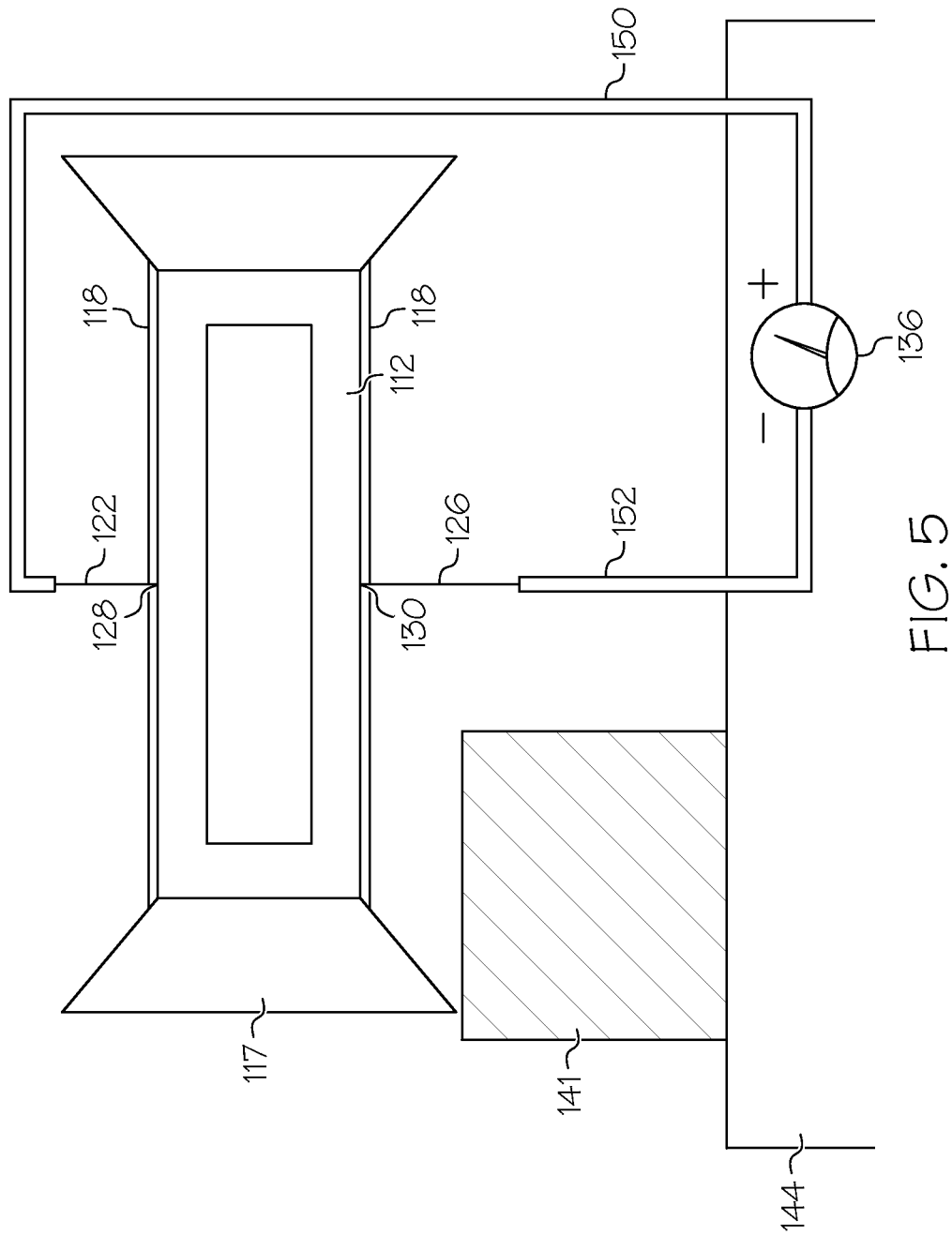
FIG. 5 is a side view of an alternative embodiment of the present invention utilizing one off-center magnet.

Referring now to FIG. 5, in another embodiment of the invention, only a single off-center magnet 141 is present. All other elements of the electricity generator remain the same. The coil(s) 118, as it spins, cuts through the flux lines of the magnet(s) 141, causing electrical current to be generated. It should be recognized that although the magnet is shown above the coil, the magnet(s) 141 can be situated anywhere that, as the coil spins, the flux lines of the magnet(s) 141 are crossed.

So whether a magnet is inside or outside the coil(s) 118, it still creates an electric field or electric current as long as the coil(s) 118 is in motion. Or vice versa, if any outside magnet 141 is in motion and is the near the coil(s) 118 of the apparatus, it still creates an electric field or electric current. Additionally, in alternative embodiments, the coil and or/magnet may be configured to have linear motion instead of rotational motion. For example, a constant alternating back and forth position may be used in creating an electrical field when passing its magnetic field near the coil.

Figure 6:
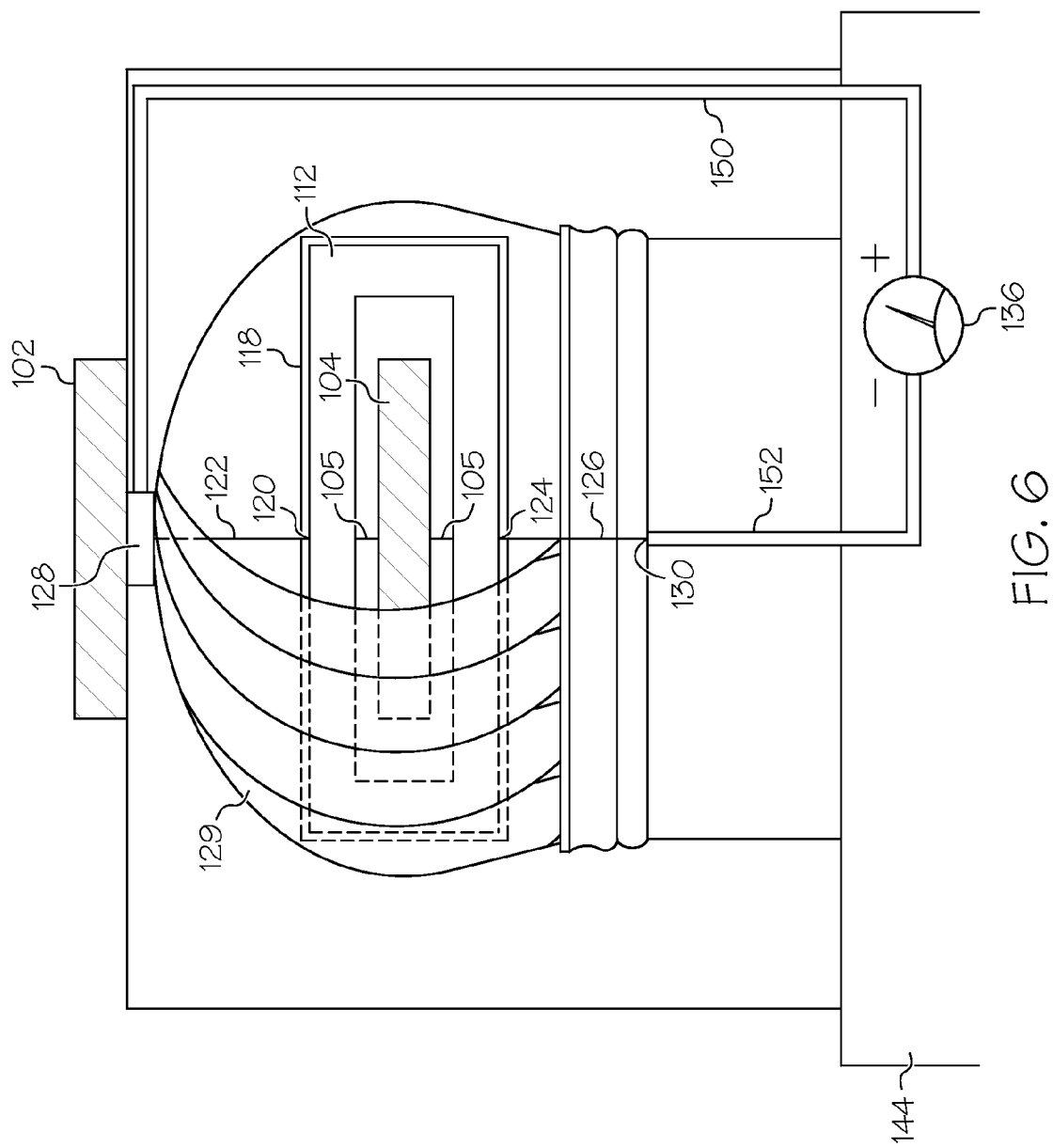
FIG. 6 is a side cutaway view of another alternative embodiment of the present invention utilizing a wind turbine.

Referring now to FIG. 6, a side cutaway view of another alternative embodiment of the present invention utilizing a wind turbine is shown. Turbine assembly 129 is mounted on base 144 and mechanically coupled to coil 118, such that it spins relative to magnets 102 and 104. Alternatively, the apparatus may be configured such that the magnets spin and the coil is stationary. During operation, the turbine spins (e.g. due to wind) and as a result, electricity is delivered with the wires positive 150 and negative 152 to meter 136 for the electric circuit.

Embodiments of the present invention also provide a method of generating electricity, the steps comprising: exposing a windmill generator to a wind source, the wind generator comprising: at least one magnet disposed within a coil frame armature attached to at least one needle, the coil frame armature comprising an inner frame around which a coil is wrapped; wherein in response to moving wind or air striking a set of wings attached to the at least one magnet, the flux lines of the magnetic field of the at least one magnet are crossed by the coil(s). This causes the coil to be exposed to a varying magnetic field, which, in accordance with Faraday's law of induction, generates electricity.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. An electricity generator, comprising:
a plurality of magnets,
wherein a first magnet of the plurality of magnets is substantially stationary and centrally disposed within a coil frame armature, the coil frame armature being configured to rotate and comprising a frame around which a coil is wrapped;
wherein a second magnet of the plurality of magnets is stationary, outside the coil frame armature, and disposed to attract the first magnet along an axis of rotation of the coil frame armature;
wherein a pinpoint needle is embedded within the first magnet of the plurality of magnets, the pinpoint needle balancing the first magnet within a first end and a second end of the coil frame armature;
wherein the pinpoint needle is configured to hold the first magnet in tension with the second magnet, wherein the first magnet is held in place by the second magnet and the pinpoint needle; and
wherein the electricity generator is configured to generate electricity in response to the coil crossing flux lines of a magnetic field of at least the first magnet.

2. The electricity generator of claim 1, wherein the flux lines are crossed by rotation of the coil.

3. The electricity generator of claim 2, wherein the coil frame armature comprises a set of wings attached to the frame, and rotation of the coil is in response to moving air striking the set of wings.

4. The electricity generator of claim 1, wherein the plurality of magnets further comprises a third magnet disposed outside the coil frame armature.

5. The electricity generator of claim 1, wherein at least one of the magnets are rare earth magnets.

6. The electricity generator of claim 1, further comprising a holding frame on which the second magnet of the plurality of magnets is embedded.

7. The electricity generator of claim 1, the armature further comprising a first metal plate at a top of the coil frame armature and a second metal plate at a bottom of the coil frame armature, through which electrical energy is conducted.

8. The electricity generator of claim 1, further comprising a first needle connecting a first end of the coil to a metal plate, and a second needle attaching a second end of the coil to a second metal plate.

9. The electricity generator of claim 1, further comprising a meter.

10. The electricity generator of claim 9, further comprising a positive wire attaching a first metal plate to the meter, and a negative wire attaching a second metal plate to the meter.

11. The electricity generator of claim 1, further comprising a base.

12. An electricity generator, comprising:
a turbine blade assembly;
a coil frame armature rotatably supported by two needles at a top end and at a bottom end and mechanically coupled to the turbine blade assembly;
a substantially stationary magnet disposed in proximity to an axis of rotation of the coil frame armature;
a pinpoint needle embedded within the substantially stationary magnet, the pinpoint needle balancing the substantially stationary magnet within a first end and a second end of the coil frame armature; and
a suspensor magnet disposed outside of the coil frame armature, configured to suspend the substantially stationary magnet in a magnetic field, wherein the pinpoint needle holds the substantially stationary magnet and suspensor magnet in tension,
wherein in response to flux lines of a magnetic field of the at least one magnet being crossed by the coil, electricity is generated.

13. The electricity generator of claim 12, wherein the two needles are non-magnetic.

14. The electricity generator of claim 13, wherein the two needles are comprised of a material selected from the group consisting of: plastic, aluminum, and ceramic.

15. The electricity generator of claim 12, wherein at least one of the magnets comprises a rare earth magnet.

16. The electricity generator of claim 12, wherein at least one of the magnets comprises a neodymium magnet.

17. The electricity generator of claim 12, wherein at least one of the magnets comprises a samarium cobalt magnet.

18. An electricity generator comprising:
a coil frame armature disposed to rotate within an outer frame;
a set of wings attached to the coil frame armature;

a first substantially stationary neodymium magnet disposed within the coil frame armature;

a second substantially stationary neodymium magnet disposed above the outer frame and configure to attract the first magnet and disposed above the first magnet along an axis of rotation of the coil frame armature;

a pinpoint needle embedded within the first magnet, the pinpoint needle balancing the first magnet within a first end and a second end of the coil frame armature;

wherein the pinpoint needle is configured to hold the first magnet in tension with the second magnet, wherein the first magnet is held in place by the second magnet and the pinpoint needle;

a positive wire connected from a first end of the coil frame armature to a first pinpoint needle engaged with the outer frame; and a negative wire connected from a second end of the coil frame armature to second pinpoint needle engaged with the outer frame;

wherein electrical energy flows through the positive wire and the negative wire in response to the coil frame armature rotating about the first magnet.

19. The electricity generator of claim 18, wherein the wings are comprised of aluminum.

* * * * *